Patented Aug. 25, 1942

2,294,299

UNITED STATES PATENT OFFICE 2,294,299

INSECTICIDAL COMPOSITIONS

William F. Hester, Drexel Hill, and W E Craig, Philadelphia, Pa., assignors to Röhm & Haas Company, Philadelphia, Pa.

No Drawing. Application November 28, 1940, Serial No. 367,568

7 Claims. (Cl. 167—30)

This invention relates to insecticidal compositions, having as an active principle a substituted aromatic amine of the formula $$Ar(OC_nH_{2n})_xNHC_6H_5$$

wherein Ar is a nitroaryl group of the benzene and naphthalene series, $x$ is an integer from one to four inclusive, and $n$ represents an integer having a value of at least two. The alkylene group represented by —$C_nH_{2n}$— contains at least two carbon atoms between oxygen and nitrogen atoms or between recurring oxygen atoms and may be a straight or branched chain radical such as

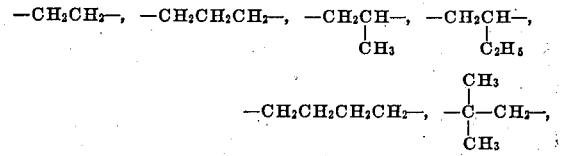

etc. The nitroaryl group may contain in addition to one or more nitro groups a neutral group such as alkyl, alkylene, aryl, cycloalkyl, aralkyl, alkoxy, acyl, etc.

Compounds of the above formula are prepared by reacting between about 50° C. and about 200° C. aniline and a nitroaryl alkylene ether halide, the alkylene chain of which may be interrupted by oxygen atoms. One of the products of the reaction, a hydrogen halide, is reacted with an alkali and the resulting alkali halide may be dissolved in water. The reaction product may be taken up in an organic solvent, such as benzene, from which the desired product is separated.

Instead of aniline, as shown in the above method of preparation, there may be used an aniline derivative having a nuclear substituent, such as p-chloroaniline, p-bromoaniline, the various toluidines, and xylidines, naphthylamines, etc.

The nitroaryl alkylene ether halide used in preparing the compounds aforesaid may be obtained by reacting a nitrophenol with an alkylene dihalide, the alkylene chain of which may be interrupted by one or more oxygen atoms, such as BrCH₂CH₂Br
ClCH₂CH₂OCH₂CH₂Cl
ClCH₂CH(CH₃)OCH(CH₃)CH₂Cl
ClCH₂CH₂CH₂OCH₂CH₂CH₂Cl
ClCH₂CH₂OCH₂CH₂OCH₂CH₂Cl, or
BrCH₂CH₂OCH₂CH₂OCH₂CH₂OCH₂CH₂Br In the presence of an alkali hydroxide, such as sodium or potassium hydroxide. As the nitrophenol, there may be used o-, m-, or p-nitrophenol, nitrocresol, ter. butyl nitrophenol, amyl nitrophenol, diamyl nitrophenol, chloro-ter. butyl nitrophenol, methallyl nitrophenol, cyclohexyl nitrophenol, phenyl nitrophenol, benzyl nitrophenol, nitroguaiacol, caprylnitrophenol, caprylbromonitrophenol, α,α,γ,γ-tetramethylbutylnitrobromophenol, chloronitrophenol, bromonitrophenol, the various nitronaphthols, methyl nitronaphthol, ter. butyl-β-naphthol, etc. The reaction of a nitrophenol and an alkylene dihalide, the alkylene chain of which may be interrupted by oxygen, is more fully described in application Serial No. 367,375, filed November 27, 1940.

The following examples are illustrative of methods which may be used in the preparation of typical compounds having the formula $$Ar(OC_nH_{2n})_xNHC_6H_5$$

Example 1

A mixture of 50 parts of p-nitrophenoxyethyl chloride (made by treating p-nitrophenoxyethanol with thionyl chloride in pyridine), 25 parts of aniline, and 23 parts of a 50% aqueous sodium hydroxide solution was heated and stirred at 95–120° C. for 24 hours. The reaction mixture was cooled, diluted with water, and extracted with benzene. The benzene solution was dried with sodium sulfate and concentrated to give 56 parts of a residue, which was crystallized twice from benzene to give a product having a melting point of 100–102° C. and having the composition

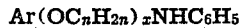

Example 2

A mixture of 54 parts of

2-NO₂-4-(CH₃)₃CCH₂(CH₃)₂CC₆H₃OC₂H₄OC₂H₄Cl.

(prepared by reacting the corresponding phenol with dichlorodiethyl ether in the presence of alkali), 15.5 parts of aniline and 13.7 parts of a 50% sodium hydroxide solution was stirred and heated under reflux for six hours, the temperature of the mixture varying from 138° C. at the start to 112° C. The reaction mixture was cooled, 200 parts of water added to dissolve sodium chloride and the mixture extracted with benzene. The benzene solution was washed twice with water, dried over calcium chloride, and the benzene removed by distillation. The residual material was then heated at 180° C. under 25 mm. pressure, to remove unreacted aniline, and a small amount of aniline hydrochloride was removed therefrom by washing a solution of the product in benzene with water. Upon removal of the benzene by distillation, there remained 49.5 parts of a viscous oil which corresponded by nitrogen analysis to 2-NO$_2$-4-(CH$_3$)$_3$CCH$_2$(CH$_3$)$_2$
$\quad\quad\quad$CC$_6$H$_3$OC$_2$H$_4$OC$_2$H$_4$NHC$_6$H$_5$

Example 3

A mixture of

2-NO$_2$-4-(CH$_3$)$_3$CC$_6$H$_3$OC$_2$H$_4$OC$_2$H$_4$OC$_2$H$_4$Cl (prepared from the corresponding nitro ter. butyl phenol, dichlorotriglycol, and caustic soda), 25 parts of aniline, and 23 parts of 50% sodium hydroxide solution was stirred and heated under reflux for six hours. The temperature varied from 136° C. at the start to 114° C. This reaction mixture was cooled, water was added, and the oily product resulting was extracted with benzene. The benzene solution was washed twice with water, and concentrated to give 90.7 parts of an oil, which was stripped of aniline by distilling and finally heating the residue at 200° C. under 30 mm. pressure. The residual material by nitrogen analysis corresponded to

2-NO$_2$-4-(CH$_3$)$_3$CC$_6$H$_3$OC$_2$H$_4$OC$_2$H$_4$OC$_2$H$_4$NHC$_6$H$_5$

Example 4

A mixture of

2-NO$_2$-4-(CH$_3$)$_3$CC$_6$H$_3$OC$_2$H$_4$OC$_2$H$_4$OC$_2$H$_4$Cl (prepared from the corresponding nitro ter. butyl phenyl, dichlorotriglycol, and caustic soda), 25 parts of aniline, and 23 parts of 50% sodium hydroxide solution was stirred and heated under reflux for six hours. The temperatures varied from 136° C. at the start to 114° C. This reaction mixture was cooled, water was added, and the oily product resulting was extracted with benzene. The benzene solution was washed twice with water, and concentrated to give 90.7 parts of an oil, which was stripped of aniline by distilling and finally heating the residue at 200° C. under 30 mm. pressure. The residual material by nitrogen analysis corresponded to

2-NO$_2$-4-(CH$_3$)$_3$CC$_6$H$_3$OC$_2$H$_4$OC$_2$H$_4$OC$_2$H$_4$NHC$_6$H$_5$

Compounds of the type herein disclosed were tested for their insecticidal value. For combatting sucking insects one part of compound was taken up in two parts of pine oil and one part of sulfonated petroleum oil, and this preparation was diluted with 400 parts of water and sprayed on nasturtium plants infested with aphids. By this procedure, one part of

2-NO$_2$-4-(CH$_3$)$_3$CC$_6$H$_3$OC$_2$H$_4$OC$_2$H$_4$OC$_2$H$_4$NHC$_6$H$_5$ in 1600 parts of spray gave a kill at 24 hours of 45%, while 2-NO$_2$-4-(CH$_3$)$_3$CCH$_2$(CH$_3$)$_2$
$\quad\quad\quad$CC$_6$H$_3$OC$_2$H$_4$OC$_2$H$_4$NHC$_6$H$_5$ under the same conditions gave a kill of 53%. Against red spiders on bush bean plants, the first compound gave a kill of 58% while the second gave a kill of 50%, both compounds being applied in the above formula, but at a concentration of 1:1200 of toxicant. Higher kills result with increased concentrations without appreciable foliage injury.

These compounds were also spread on inert solids by dissolving them in a volatile solvent, mixing the resulting solution with a finely divided solid, such as magnesium carbonate, silica, talc, etc., along with a spreading agent, mixing and evaporating the solvent. A spray containing 1% of the compound carried on talc was applied to bush beans and Mexican bean beetle larvae placed on the plants. After 24 hours the effects of the toxicant were observed. With

2-NO$_2$-4-(CH$_3$)$_3$CC$_6$H$_3$OC$_2$H$_4$OC$_2$H$_3$OC$_2$H$_4$NHC$_6$ there was attained a control of 86%, including dead larvae and larvae too incapacitated for further feeding. The same percentage control was obtained with 2-NO$_2$-4-(CH$_3$)$_3$CCH$_2$(CH$_3$)$_2$
$\quad\quad\quad$CC$_6$H$_3$OC$_2$H$_4$OC$_2$H$_4$NHC$_6$H$_5$ although the latter compound gave a somewhat greater kill at 24 hours than the first compound.

The compounds herein described may also be effectively used in dusts, containing ½% to 10% of the active parasiticidal material. The compounds are also suitable for use in conjunction with other active materials, such as rotenone, pyrethrins, nicotine, organic thiocyanates, spray oils from petroleum, tar, animal and vegetable origin, copper compounds, etc. Such mixtures give a plurality of effects or a single improved effect.

We claim:

1. An insecticidal composition having as an active principle a compound of the formula $$Ar(OC_nH_{2n})_xNHC_6H_5$$

wherein Ar is a nitroaryl group selected from the benzene and naphthalene series, $x$ is an integer having a value from one to four inclusive, and —C$_n$H$_{2n}$— is an alkylene chain of at least two carbon atoms in which $n$ has a value of two to four.

2. An insecticidal composition having as an active principle a compound of the formula $$Ar(OCH_2CH_2)_xNHC_6H_5$$

wherein Ar is a nitroaryl group selected from the benzene and naphthalene series, and $x$ is an integer having a value from one to four.

3. An insecticidal composition having as an active principle a compound of the formula $$ArOCH_2CH_2OCH_2CH_2NHC_6H_5$$

wherein Ar is a nitroaryl group selected from the benzene and naphthalene series.

4. An insecticidal composition having as an active principle a compound of the formula $$NO_2C_6H_4OCH_2CH_2OCH_2CH_2NHC_6H_5$$

5. An insecticidal composition having as an active principle a compound of the formula $$ArOCH_2CH_2OCH_2CH_2OCH_2CH_2NHC_6H_5$$

wherein Ar is a nitroaryl group selected from the benzene and naphthalene series.

6. An insecticidal composition having as an active principle a compound of the formula $$NO_2C_6H_4OCH_2CH_2OCH_2CH_2OCH_2CH_2NHC_6H_5$$

7. An insecticidal composition having as an active principle a compound of the formula

2-NO$_2$-4-(CH$_3$)$_3$CC$_6$H$_3$OC$_2$H$_4$OC$_2$H$_4$OC$_2$H$_4$NHC$_6$H$_5$

WILLIAM F. HESTER.
W E CRAIG.